Sept. 8, 1959  H. G. SCHONZEIT  2,903,040
LAMINATING APPARATUS
Filed Jan. 18, 1957  2 Sheets-Sheet 1

INVENTOR:
HYMAN G. SCHONZEIT
BY Frederick Breitenfeld
ATTORNEY

Sept. 8, 1959    H. G. SCHONZEIT    2,903,040
LAMINATING APPARATUS
Filed Jan. 18, 1957    2 Sheets-Sheet 2
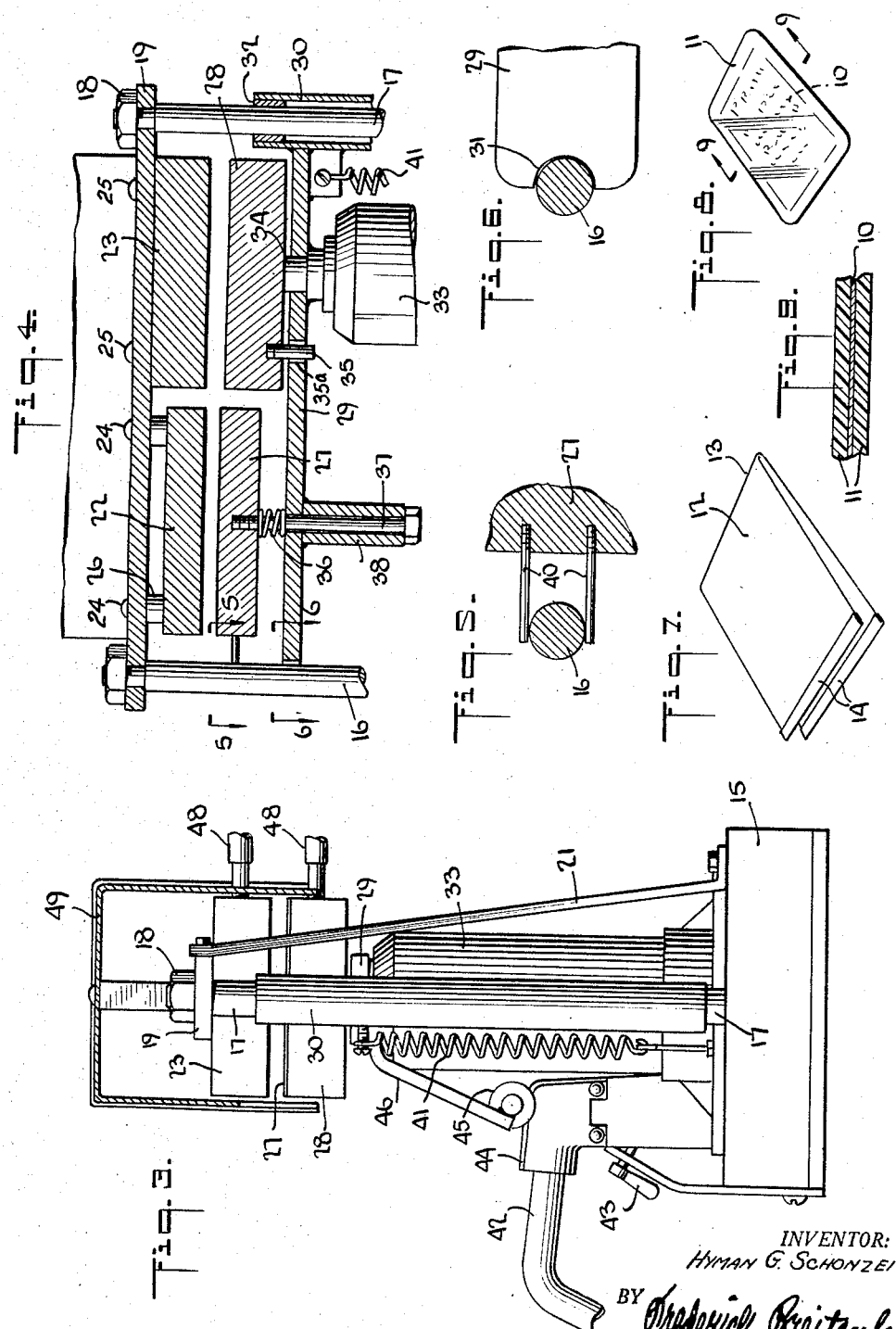
INVENTOR:
HYMAN G. SCHONZEIT
BY Frederick Breitenfeld
ATTORNEY

2,903,040

LAMINATING APPARATUS

Hyman G. Schonzeit, New York, N.Y.

Application January 18, 1957, Serial No. 634,898

4 Claims. (Cl. 154—1)

This invention relates generally to laminating apparatus, and has particular reference to the type of apparatus that is employed in bonding together, under pressure, a bundle of superposed plies of material.

The invention is primarily directed to the improvement and simplification of mechanism for bonding together a pair of transparent plastic layers between which there is sandwiched a newspaper clipping, a photograph, a document, or other material to be enveloped and shielded. In the creation of the desired laminated unit, the superposed bundle of layers is first subjected to a relatively mild pressure while heated to a predetermined degree, and then subjected to a more forceful pressure accompanied by a chilling of the plastic. One way of satisfactorily achieving this result in practice, especially where laminations of relatively small size are involved, is to employ two separate presses, independently operable so that the desired different pressures can be attained.

It is a general object of this invention to provide an improved apparatus involving a pair of presses, one heated and the other chilled, in which a single power source can be employed in a single operative procedure to close both presses simultaneously and yet achieve the desired differences in pressure to be exerted by them.

Other objectives of the invention reside in the provision of an apparatus of relatively compact and structurally simple character, relatively inexpensive to manufacture and to operate; and in the design and arrangement of parts in such a way that the operation of the apparatus is simple, requiring no special skills, and enabling the user to produce uniformly satisfactory laminated products speedily and expeditiously and at low cost.

The preferred way of achieving these objectives, and such other objects and advantages as may hereinafter appear or be pointed out, is illustratively exemplified in the accompanying drawings, in which—

Fig. 3 is a side view, from the right of Figs. 1 and 2, part of the cover having been broken away to reveal the structure beneath it;

Fig. 4 is a cross-sectional view substantially along the line 4—4 of Fig. 2, with the lower part of the apparatus omitted;

Figure 1:
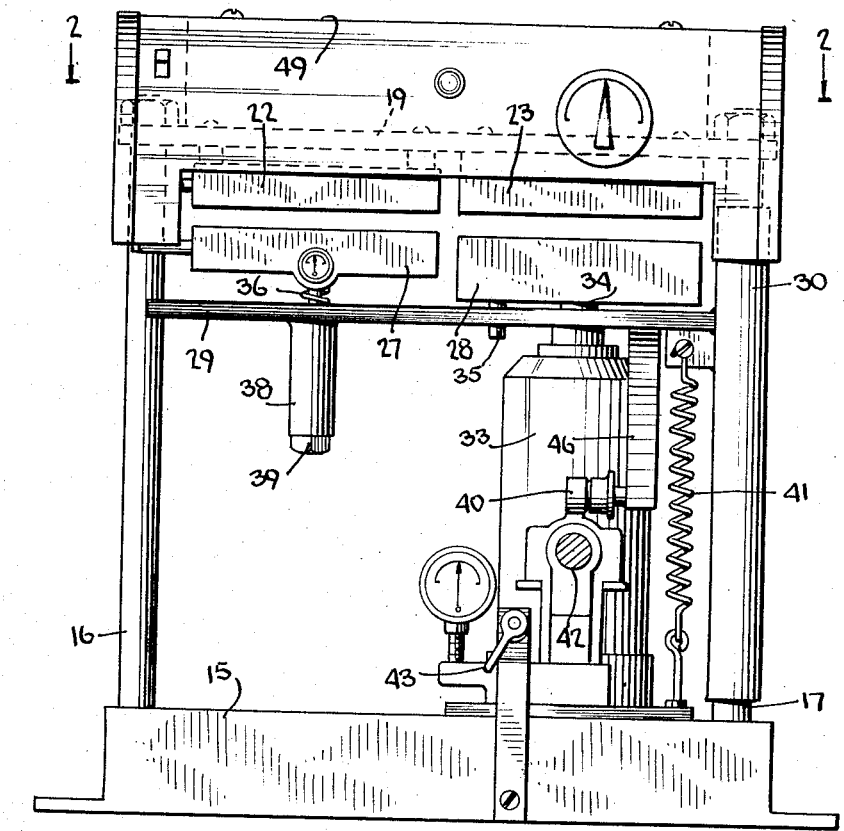
Fig. 1 is a front elevational view of a laminating apparatus constructed in accordance with this invention.

Figs. 5 and 6 are fragmentary enlarged cross-sectional views taken substantially along the lines 5—5 and 6—6, respectively, of Fig. 4;

Fig. 7 is a perspective view of the type of holder that may be employed to enclose the layers that are to be bonded together under pressure;

Fig. 8 is a perspective view of a laminated product of the type intended to be created with the aid of this apparatus; and Fig. 9 is a fragmentary enlarged cross-sectional view substantially along the line 9—9 of Fig. 8.

Referring first to Figs. 8 and 9, the intermediate layer 10 represents a photograph, tag, or other sheet to be enclosed and preserved in a plastic-covered unit, and the outer layers 11 represent elements of transparent plastic. The plastic employed may be of the vinyl type, or cellulose acetate, or any equivalent character, the sheets being usually of a thickness of approximately 0.01 inch. The interposed newspaper clipping or other element 10 is preferably somewhat thinner, and may have a thickness (for example) of approximately 0.007 inch. It is usual practice, in preparing the layers for the laminating process to arrange them in the desired superposed relation, then sandwich them between a pair of metallic plates of chromium or the like, having very dense and highly polished surfaces adjacent to the plastic layers, and then accommodate this bundle of superposed plies within the folds of an appropriate holder 12 (Fig. 7). This holder is composed of suitable material, preferably woven or matted in nature, having a rear fold line 13 and forwardly projecting superposed margins 14, the latter being engageable to move the entire assembly from place to place. The entire bundle, including the top and bottom folds of the holder itself, may have a thickness of the order of one-fourth of an inch. These dimensions are referred to merely to explain the general nature of the procedure usually followed in employing the present improved laminating apparatus. The measurements referred to are merely illustrative, and have no direct bearing upon the features of novelty of the apparatus itself.

The laminating apparatus consists essentially of a pair of presses arranged side-by-side, each having an upper platen and a lower platen and being adapted to compress an interposed bundle of superposed plies of material, such as the holder 12 and the layers carried within its confines. In accordance with the invention, a structure is provided for fixedly supporting the upper platens, and a means is provided for moving the lower platens in unison upwardly and downwardly with respect to the upper platens. In the appartus herein chosen for illustration, the supporting structure consists of a suitable base 15 on which there is a pair of spaced vertical columns 16 and 17, preferably circular in cross-section. Secured to the upper ends of these columns, by nuts 18 or the like is a rigid cross-bar 19. An upstanding rib 20 may be formed on this cross-bar to increase its strength and rigidity. A brace 21, extending downwardly from the bar 19 to the base 15 (see Figs. 2 and 3) strengthens the structure.

The fixed upper platens of the two presses are indicated at 22 and 23. They are rigidly secured to the cross-bar 19, beneath the latter. Fastening elements 24 extend downwardly through the cross-bar 19 and engage with the platen 22, and similar fasteners 25 may be employed to secure the platen 23 in position. Because the platen 22 is to be treated, it may be desirable to interpose suitable spacing sleeves 26 (see Fig. 4) between the bar 19 and the platen 22.

The platens 22 and 23 are supported in such a way that the downwardly directed faces of these platens lie in the same horizontal plane. On the other hand, the corresponding lower platens are so supported and arranged that the upwardly directed faces lie in horizontal planes slightly offset from one another when the presses are open. Thus, it will be observed that the lower platen 27, beneath the fixed platen 22, has a top surface lying in a horizontal plane slightly higher than the top surface of the platen 28 which lies beneath the fixed platen 23.

The lower platens 27 and 28 are supported upon a single cross-bar 29 extending between the columns 16 and 17 and guided on these columns for up-and-down movement. Thus, at its end adjacent to the platen 28, the cross-bar 29 is rigidly secured to an elongated sleeve 30 slidably encircling the column 17. At its opposite end the bar 29 is provided with an arcuate cutout 31 arranged in guiding relation to the column 16. Appropriate antifriction bushings 32 may be carried by the sleeve 30, as indicated in Fig. 4.

A single power source is mounted on the base 15 between the columns 16 and 17 and beneath the movable cross-bar 29. This preferably consists of an hydraulic jack 33 having an upwardly projecting plunger end 34. This plunger end is welded or otherwise rigidly secured to the cross-bar 29, so that movements of the plunger upwardly or downwardly carry the cross-bar 29 with it.

It will be noted that the jack 33 lies directly beneath the platen 28. In order that the stresses imposed upon this platen during the operation of the press shall not be transmitted to the plunger of the hydraulic jack 33, the platen 28 rests upon but is disconnected from the plunger end 34. In order to retain the platen 28 in proper relation to the companion platen 23, rotation with respect to the cross-bar 29 is prevented by providing a downwardly projecting pin 35 on the platen 28, this pin extending through a positioning hole 35a in the bar 29.

One of the features of the invention lies in the provision of yieldable means for supporting one of the lower platens, but not the other. The yieldable support is associated with the lower platen 27, and it preferably consists of a compression spring 36 interposed between the upper surface of the bar 29 and the lower surface of the platen 27. To guide the yielding movements of the platen 27, it is provided with a downwardly-extending pin 37 which rides within a corresponding downwardly-extending neck 38 rigidly secured to the bar 29. At its lower end the pin 37 is provided with an enlarged end 39 adapted to bear against the lower end of the neck 38 and thereby limit the upward movement of the platen 27 relative to the bar 29. To prevent rotation of the platen 27, guide pins 40 or the like may be formed at one end, for sliding engagement with opposite faces of the column 16, as best indicated in Fig. 5.

A tension spring 41 extends downwardly from the cross-bar 29 to the base 15. This spring constantly urges the bar 29 in a downward direction, so that the normal disposition of the parts is as shown in the drawings, the presses being open.

The hydraulic jack 33 may be of any known type, and includes the usual handle 42, by means of which fluid from a reservoir within the jack is pumped beneath the plunger to raise the latter. The jack installation is also provided with a valve 43, the manipulation of which releases the fluid pressure beneath the plunger and allows the plunger to resume its normal lowered position. Preferably, the jack mechanism includes also a camming surface 44 on the inner end of the handle, adapted to press upwardly upon a follower 45 secured on an arm 46 that extends upwardly and bears against the lower surface of the cross-bar 29. When the handle is lifted, prior to the pumping operation, the cross-bar 29 and the platens carried by it are moved upwardly into a position which brings the work into contact with both the lower and upper platens, whereby fewer pumping strokes are needed than would otherwise be required, to impart the desired pressure to the material interposed between the platens of each press.

Figure 2:
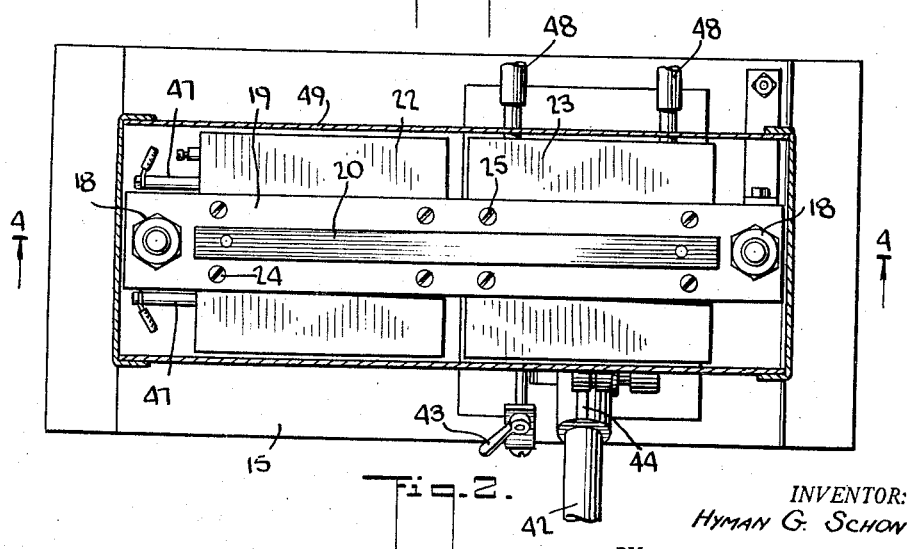
Fig. 2 is a plan view substantially along the line 2—2 of Fig. 1.

Before describing the operation of the apparatus, it is to be observed that suitable electric heating units are associated with the platens 22 and 27, in order to impart the desired heat to them. Any appropriate types of heating units may be used, and they have not been shown in detail. The leads 47 from these heating units are indicated in Fig. 2. Obviously, if desired, steam or other heating medium may be employed. The platens 23 and 28, on the other hand, are chilled, and this may be achieved by providing appropriate passages in the platens themselves and directing cooling liquid into and through these passages. In Fig. 2 I have indicated the inlet and outlet of such a circulating system by the reference numeral 48, but the details of the passages through which the cooling liquid flows have not been shown, since the cooling of platens is well known per se.

In using the apparatus, the operator first sandwiches the desired clipping or document 10 between layers of plastic 11, these layers being slightly larger in dimensions so that the intermediate layer will be completely enclosed. This bundle is then associated with the other elements hereinbefore described, within the confines of the holder 12, and this holder is then grasped along the front margins 14 and inserted rearwardly into the space between the upper and lower platens 22 and 27. The hydraulic jack is then actuated to close the press. The interposed bundle remains in the press for a predetermined period of time during which the plastic sheets become softened and are brought into firm contact with the interposed element between them. The platens are preferably heated to a temperature of between 300 and 350° F., and under these circumstances the press remains closed for about 45 seconds. During this period of time the operator prepares another bundle of superposed plies of material, and arranges them within an appropriate holder 12. By manipulation of the valve 43 the cross-bar 29 is allowed to fall under the influence of the spring 41, and when the presses are fully open the operator engages the bundle resting upon the platen 27 and shifts it toward the right so that it comes to rest on the platen 28. During this shifting movement, the bundle of plies remains undisturbed, and the shifting movement is facilitated by the circumstance that the level of the top surface of the platen 27 is slightly higher than that of the platen 28. The operator then inserts the newly-prepared bundle into the space above the platen 27, and the hydraulic jack is again actuated to raise the movable platens and close the presses. Because of the yieldable support associated with the movable platen 27, it exerts less pressure upon the bundle above it than the platen 28 exerts upon the bundle upon which it is acting. For example, notwithstanding the fact that a single jack is actuating both movable platens, the pressure exerted between the platens 22, 27 will reach a maximum of, say, 100 lbs. per square inch, whereas the pressure exerted by the platens 23, 28 will simultaneously reach a maximum of, say, 400 lbs. per square inch. After another predetermined period of time (which may be, as hereinbefore mentioned, approximately 45 seconds if the heated platens are at a temperature of approximately 300 to 350° F.), the valve 43 is again actuated to allow the presses to open. The operator then removes the bundle from the press at the right, shifts the heated bundle to the cooled press, and inserts a newly-prepared bundle into the heated press. The procedure is then repeated, and during each period of time that the presses are closed, the operator removes a completed laminated unit from one holder, and prepares a new bundle of elements to be bonded. Thus, laminated units can be produced at a rapid rate, of uniformly good quality, and with a minimum of effort and at low cost.

The apparatus may be provided with such switches, gauges, indicators, or other accessories as may prove to be desirable. Also, the upper part of the structure is preferably enclosed within a protective shield or housing 49.

In general, it will be understood that many of the details herein described and illustrated may be modified by those skilled in the art without necessarily departing from the spirit and scope of the invention as expressed in the appended claims.

Having thus described my invention and illustrated its use, what I claim as new and desire to secure by Letters Patent is:

1. In a laminating apparatus, a pair of presses arranged side by side, each having an upper platen and a lower platen and being adapted to compress an interposed bundle of superposed plies of material, means for supporting the upper platens with their operative faces in a fixed horizontal plane, said supporting means comprising a pair of spaced columns and a fixed cross-bar secured to their upper ends, means for supporting the lower platens so that when the presses are open the operative face of one of them is in a plane slightly higher than the other so that when a bundle of material is shifted from the surface of the higher-positioned platen it will descend slightly to come to rest on the surface of the lower-positioned platen, said supporting means for the lower platens comprising a movable cross-bar extending between and guided on said columns and underlying both lower platens, means for moving the lower platens in unison upwardly to positions of pressure application and downwardly with respect to the upper platens, said means comprising a spring arranged to urge the movable cross-bar downwardly and a jack for moving said cross-bar upwardly against the action of said spring, and a compression spring operatively interposed between said movable cross-bar and the higher one of the two lower platens so that the latter will exert less pressure than the other lower platen upon similar interposed bundles.

2. In a laminating apparatus, a pair of presses arranged in a side-by-side relation, each press consisting of an upper and a lower platen, each pair of platens being adapted for the compression of a separate bundle of material between them, a single support for maintaining the upper platens with their operative faces arranged in a fixed horizontal plane, said support including a fixed cross-bar to which the upper platens are attached, means for supporting the lower platens consisting of a vertically-movable cross-bar, means for guiding the latter cross-bar in its up and down movements, the first of the lower platens being spring-supported and normally maintained by its spring-supporting means with its upper surface elevated higher than the upper surface of the second lower platen, a hydraulic jack having a piston rod secured to the last-mentioned cross-bar and operative to simultaneously move both lower platens upwardly to positions of pressure application upon raising movement of the piston rod, the second lower platen resting against but being unattached to the upper end of the piston rod, said second lower platen being pressure-operated directly by said piston, said first lower platen being pressure-operated only by the spring under it and guide means operative between the second lower platen and the cross-bar over which it is supported for holding said platen against disalignment with respect to the upper platen with which it cooperates.

3. In a laminating apparatus, a pair of presses arranged side by side, each having an upper and a lower platen and being adapted to compress an interposed bundle of superposed plies of material, means for heating the platens in one press and for cooling the platens in the other, a common structure fixedly supporting the upper platens in both presses, said platens being mounted to lie in the same horizontal plane, means for simultaneously moving the lower platens in both presses upwardly to positions of pressure-application, the lower platen in the heated press being mounted to lie in a horizontal plane slightly offset with respect to the platen in the cooled press and the lower platen in the heated press being mounted to lie higher when both presses are open for loading, yieldable means supporting the lower platen of the heated press, said yieldable-supported lower platen exerting less pressure upon similar interposed bundles of material than the lower platen in the cooled press when both presses are closed.

4. In a laminating apparatus, a pair of presses arranged in a side-by-side relation, each press consisting of upper and lower platens, said upper and lower platens in each press being adapted for the compression of a separate bundle of plastic material between them, one press of said pair being utilized for heating and the other press for compressing and cooling said plastic material, a single support for mounting the upper platens of the heating and cooling presses with their operative faces arranged downwardly in a fixed horizontal plane, said support including a fixed cross-bar to which both upper platens are attached, means for supporting the lower platens with their operative faces upward, said last-mentioned supporting means consisting of a vertically-movable cross-bar, the lower platen of the heating press being spring-supported on said cross-bar with the platen mounted over said spring and normally maintained by said spring with its upper working surface somewhat higher than the upper working surface of the lower platen of the cooling press, hydraulic jack means mounted directly under the lower platen of said cooling press, said jack means having a piston rod secured to said movable cross-bar and operative to simultaneously move both lower platens upwardly to positions of pressure application, electrical means for heating the upper and lower platens of the heating press, and cooling water means for cooling the upper and lower platens of the cooling press.

References Cited in the file of this patent

UNITED STATES PATENTS

| | | |
|---|---|---|
| 1,564,366 | Overton | Dec. 8, 1925 |
| 1,614,601 | Davis | Jan. 18, 1927 |
| 2,003,103 | Berry | May 28, 1935 |
| 2,289,618 | Young | July 14, 1942 |
| 2,500,895 | Davies | Mar. 14, 1950 |
| 2,638,964 | Andina | May 19, 1953 |
| 2,640,517 | DeMello | June 2, 1953 |
| 2,641,304 | Biddinger | June 9, 1953 |
| 2,746,514 | Warnken | May 22, 1956 |
| 2,764,862 | Rado | Oct. 2, 1956 |

FOREIGN PATENTS

| | | |
|---|---|---|
| 594,651 | Great Britain | Nov. 17, 1947 |